(12) United States Patent
Feigel et al.

(10) Patent No.: US 9,487,204 B2
(45) Date of Patent: Nov. 8, 2016

(54) METHOD FOR CALIBRATING ANALOG-CONTROLLED HYDRAULIC VALVES AND BRAKE SYSTEM COMPRISING AN ELECTRONIC CONTROL AND REGULATING UNIT IN WHICH THE METHOD IS CARRIED OUT

(71) Applicant: Continental Teves AG & Co. oHG, Frankfurt (DE)

(72) Inventors: Hans-Jörg Feigel, Rosbach (DE); Harald Biller, Eschborn (DE); Jan Hoffmann, Rosbach (DE); Christian Courth, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 266 days.

(21) Appl. No.: 14/382,586

(22) PCT Filed: Mar. 5, 2013

(86) PCT No.: PCT/EP2013/054364
§ 371 (c)(1),
(2) Date: Sep. 3, 2014

(87) PCT Pub. No.: WO2013/131891
PCT Pub. Date: Sep. 12, 2013

(65) Prior Publication Data
US 2015/0020520 A1 Jan. 22, 2015

(30) Foreign Application Priority Data

Mar. 6, 2012 (DE) .................. 10 2012 203 493
Mar. 4, 2013 (DE) .................. 10 2013 203 599

(51) Int. Cl.
*B60T 17/22* (2006.01)
*B60T 8/36* (2006.01)
*B60T 8/40* (2006.01)
*B60T 7/04* (2006.01)
*B60T 11/10* (2006.01)
*B60T 11/16* (2006.01)
*B60T 15/02* (2006.01)

(52) U.S. Cl.
CPC ............... *B60T 17/22* (2013.01); *B60T 7/042* (2013.01); *B60T 8/36* (2013.01); *B60T 8/3655* (2013.01); *B60T 8/4081* (2013.01); *B60T 11/103* (2013.01); *B60T 11/16* (2013.01); *B60T 15/028* (2013.01)

(58) Field of Classification Search
CPC ........ B60T 17/22; B60T 8/36; B60T 8/3655; B60T 8/4081; B60T 7/042; B60T 11/103; B60T 11/16; B60T 15/028
See application file for complete search history.

(56) References Cited

U.S. PATENT DOCUMENTS

| | | | | |
|---|---|---|---|---|
| 6,003,960 A * | 12/1999 | Gronau | ...................... | B60T 8/36 303/166 |
| 6,030,055 A * | 2/2000 | Schubert | ................. | B60T 7/042 303/10 |
| 8,718,895 B2 | 5/2014 | Loos | | |
| 2002/0096937 A1* | 7/2002 | Nishikimi | ............... | B60T 8/326 303/117.1 |
| 2003/0085613 A1* | 5/2003 | Nakano | ...................... | B60T 8/00 303/114.1 |
| 2007/0112537 A1* | 5/2007 | Gronau | ...................... | B60T 8/36 702/105 |
| 2007/0158607 A1* | 7/2007 | Fey | ........................... | B60T 8/36 251/129.16 |
| 2007/0252098 A1* | 11/2007 | Schmidt | .................... | B60T 8/36 251/129.01 |
| 2010/0090521 A1* | 4/2010 | Loos | ........................ | B60T 8/36 303/20 |
| 2012/0169112 A1 | 7/2012 | Jungbecker | | |
| 2013/0106170 A1* | 5/2013 | Baek | ...................... | B60T 13/166 303/11 |

FOREIGN PATENT DOCUMENTS

| DE | 19707960 | 9/1998 |
|---|---|---|
| DE | 102005049300 | 4/2007 |
| DE | 102006057501 | 11/2007 |
| DE | 102006055767 | 3/2008 |
| DE | 102011075295 | 11/2012 |

| WO | 2005054028 | 6/2005 |
| WO | 2006035036 | 4/2006 |
| WO | 2007042349 | 4/2007 |
| WO | 2011029812 | 3/2011 |

OTHER PUBLICATIONS

International Search Report for PCT/EP2013/054364 mailed May 7, 2013.
German Search Report mailed Oct. 21, 2013 in counterpart German Application No. 10 2013 203 599.3, including partial translation.
Written Opinion of the International Searching Authority for International Application No. PCT/EP2013/054364.

* cited by examiner

*Primary Examiner* — Mussa A Shaawat
(74) *Attorney, Agent, or Firm* — RatnerPrestia

(57) ABSTRACT

The invention relates to a method for determining a driving characteristic of an analogized or analog-controlled hydraulic valve of a brake system for motor vehicles, comprising hydraulically operatable wheel brakes, in which a brake pressure (pDBE), which is generated with the aid of an electrically controllable, electric-motor-driven (110, 35) driven pressure supply device (101, 5), is conducted to a wheel brake (105*a*, 105*b*; 8-11) via an inlet valve (102*a*, 102*b*; 6*a-d*) and can be conducted in particular via an outlet valve (103*a*, 103*b*, 7*a-d*) from the wheel brake into a pressure medium container (104, 4). In order to operate the brake system, the pressure supply device and the inlet valves, and in particular the outlet valves, can be controlled by an electronic control and regulating unit (110, 12), wherein for determining the control characteristic of an analogized or analog-controlled inlet or outlet valve, a brake pressure is generated by the control and regulating unit via the pressure supply device, and the brake pressure (pDBE) is determined by means of a pressure sensor (106, 19) associated with the pressure supply device, and the determined brake pressure and an associated valve control variable (I, U) are stored as a calibration point of the control characteristic (f, F). The invention also relates to a brake system.

15 Claims, 2 Drawing Sheets

METHOD FOR CALIBRATING ANALOG-CONTROLLED HYDRAULIC VALVES AND BRAKE SYSTEM COMPRISING AN ELECTRONIC CONTROL AND REGULATING UNIT IN WHICH THE METHOD IS CARRIED OUT

CROSS REFERENCE TO RELATED APPLICATIONS

This application is the U.S. National Phase Application of PCT/EP2013/054364, filed Mar. 5, 2013, which claims priority to German Patent Application No. 10 2012 203 493.5, filed Mar. 6, 2012 and German Patent Application No. 10 2013 203 599.3, filed Mar. 4, 2013, the contents of such application being incorporated by reference herein.

FIELD OF THE INVENTION

The invention relates to a method for determining a control characteristic of an analogized or analog-controlled hydraulic valve and to a brake system.

BACKGROUND OF THE INVENTION

In brake systems with antilock control systems (ABS) or electronic stability programs (ESP), analogized valves ("AD valves") are often used to control the hydraulic fluid. The current at which the AD valve opens is heavily dependent on the pressure difference across the valve. In order to be able to control the AD valves, it is necessary, for example, to know the value of this current, which is referred to as the "opening point". The opening point is furthermore dependent on manufacturing tolerances and on the wear of the valve and of other components in the brake system.

In order to operate valves with sufficient accuracy in an analog manner, it is necessary to know the opening characteristic or, more generally, the control characteristic. To configure the production of the AD valves in such a way that each valve exhibits identical control characteristics (e.g. current/pressure characteristic curve), is not possible owing to tolerances or represents an unacceptable expense. Even if this were possible, change over the service life represents a further problem. Calibrating each valve individually is very time-consuming in production and increases costs considerably. However, without being able to operate the valves with appropriate accuracy, functional utility decreases.

A method for calibrating the pressure/opening current characteristic of an analogized or analog-controlled hydraulic inlet valve is known from DE 10 2006 057 501 A1, which is incorporated by reference. The method is carried out in a brake system for motor vehicles having two brake circuits, wherein each brake circuit is assigned two wheel brakes, a hydraulic pump and a low-pressure reservoir and wherein a brake pressure produced with the aid of the hydraulic pump passes via an inlet valve to a wheel brake and can be passed out of the wheel brake into a low-pressure reservoir via an outlet valve. In this case, a pressure sensor is provided, which is assigned to one of the two wheel brakes and determines the wheel brake pressure fed into said wheel brake. Thus, just one wheel brake sensor for each brake circuit is necessary to carry out this method.

SUMMARY OF THE INVENTION

An aspect of the invention is a method for calibrating analogized inlet and/or outlet valves which operates reliably, on board (in continuous operation), automatically and independently of the vehicle driver, can be carried out with comparatively little expenditure of time and can be used in a brake system in which there are no pressure sensors assigned to the wheel brakes.

An aspect of invention is based on the concept of determining a control characteristic, which describes at least one relationship of dependence between an electric valve control variable and a differential pressure or pressure present at the valve, of an electrically controllable, analogized or analog-controlled hydraulic inlet or outlet valve by means of an electric-motor-driven pressure supply device of the brake system and a pressure sensor assigned to the pressure supply device. Thus, the pressure sensor determines the pressure produced at the inlet ports of the inlet valves by the pressure supply device. To determine the control characteristic, a brake pressure is produced by the control and regulating unit by means of the pressure supply device and the magnitude of the brake pressure is determined by means of the pressure sensor. The brake pressure determined and an associated valve control variable are stored as a calibration point of the control characteristic.

The calibration points of the control characteristic are advantageously stored in the control and regulating unit, in which they are directly available for control of the valves.

One advantage of the invention is that the relationship between the valve control variable and pressure and, if appropriate, volume flow (control characteristic) can be determined by the brake system itself for each analogized or analog-controlled inlet and outlet valve, for which purpose no wheel brake pressure sensors but just one pressure sensor assigned to the pressure supply device is required. With the aid of the individual control characteristics determined for the individual valves, fine and largely silent wheel-specific pressure control is then possible, and it is possible to dispense with wheel brake pressure sensors for pressure control.

The brake system preferably comprises one analogized or analog-controlled inlet valve for each wheel brake. As a particularly preferred option, the inlet valves allow the respective brake circuit pressures through in the unactivated state (open when deenergized).

It is furthermore preferred that there should be one analogized or analog-controlled outlet valve for each wheel brake. As a particularly preferred option, the outlet valves are in a blocked state in the unactivated state (closed when deenergized). However, the method according to the invention can also be carried out in a brake system with "multiplex" inlet valves (i.e. outlet valves can be absent).

In brake systems in which some of the inlet and/or outlet valves can be controlled in an analog manner and the others can be controlled digitally, the method according to the invention is preferably carried out for all the valves capable of analog control.

The inlet and outlet valves are preferably embodied as an electromagnetically controllable valves, wherein the electric control variable is an electric current to be fed to the electromagnetic drive.

Regions of the control characteristic are preferably completed by interpolation or extrapolation or by means of a model, in order to determine the control characteristic between calibration points or in regions without a calibration point. Thus, only a small number of calibration points need be determined. To ensure that the complete control characteristic can be evaluated quickly, the completed control characteristic is particularly preferably stored in the control and regulating unit, e.g. in the form of a table of values.

The control characteristic determined is preferably evaluated in the control and regulating unit during the operation of the brake system in order to regulate the wheel brake pressure of the associated wheel brake.

It is preferred if the wheel brakes can be connected via the outlet valves to a pressure medium reservoir under atmospheric pressure. The pressure in the pressure medium reservoir can then be assumed to be constant, and the control characteristic can simply be formed as a function of the input-side pressure of the inlet or outlet valve.

According to a development of the invention, the control characteristic of the inlet or outlet valve is determined for various volume flows through the valve by determining the control characteristic at various volume flows of the pressure supply device. It is advantageous if the volume flow of the pressure supply device is determined by means of the motor speed of the electric motor of the pressure supply device, which is often available in any case for the purpose of controlling the pressure supply device.

The following method steps, advantageously in the sequence indicated, are preferably carried out in order to determine the control characteristic of an outlet or inlet valve of a wheel brake:
- closure of the outlet/inlet valve to be calibrated and opening of the associated inlet/outlet valve of the wheel brake,
- buildup of a predetermined value of the brake pressure by means of the pressure supply device and stopping of the electric motor of the pressure supply device,
- changing of the valve control variable of the outlet/inlet valve to be calibrated, causing the outlet/inlet valve to be calibrated to open,
- detecting the opening of the outlet/inlet valve to be calibrated by means of the pressure sensor, determining the associated values of the valve control variable and the brake pressure, and storing the determined calibration point in the control and regulating unit.

In order to obtain a number of calibration points, a change in the valve control variable is particularly preferably carried out at each of various brake pressure values. By means of this method, the opening characteristic curve of the valve to be calibrated is determined.

During the method steps, at least one wheel brake is preferably connected hydraulically to the pressure supply device.

As a particularly preferred option, at least the wheel brake of the outlet valve to be calibrated is continuously connected hydraulically to the pressure supply device during the determination of the control characteristic of an outlet valve. In the case of the determination of the control characteristic of an inlet valve, at least one wheel brake other than the wheel brake of the inlet valve to be calibrated is continuously connected hydraulically to the pressure supply device during the determination of the control characteristic of the inlet valve. In both cases, at least one hydraulic capacity (wheel brake) is connected to the pressure supply device. This makes it easier to set the pressure, and unavoidable small leakages have only a slight effect on the pressure.

According to an alternative, preferred embodiment of the method according to the invention, the following method steps, particularly preferably in the sequence indicated, are carried out in order to determine the control characteristic of an inlet valve:
- closure of all the inlet valves and opening of at least the outlet valve of the wheel brake of the inlet valve to be calibrated,
- buildup of a brake pressure by means of the pressure supply device and setting of a valve control variable at the inlet valve to be calibrated, causing the inlet valve to be calibrated to open,
- detecting the opening of the inlet valve to be calibrated by means of a volume flow of the pressure supply device or the motor speed of the electric motor of the pressure supply device, determining the associated values of the valve control variable and the brake pressure, and storing the determined calibration point in the control and regulating unit.

In order to obtain a number of calibration points, the particularly preferred procedure is one in which the inlet valve to be calibrated is opened either by carrying out a brake pressure buildup by means of the pressure supply device at each of various values of the valve control variable or carrying out a change in the valve control variable at each of various brake pressures of the pressure supply device or repeatedly carrying out a simultaneous brake pressure buildup by means of the pressure supply device and a change in the valve control variable.

According to an alternative preferred embodiment of the method, the outlet valve of the wheel brake of the inlet valve to be calibrated is closed, and the pressure in this wheel brake is determined from the specified or already known (predetermined) pressure/volume characteristic curve thereof and from the pressure medium volume output by the pressure supply device. A corresponding embodiment is also advantageous with the other methods described in the case of the calibration of an inlet valve.

Another preferred procedure for determining the control characteristic of an outlet valve or inlet valve of a wheel brake is to carry out the following method steps, advantageously in the sequence indicated:
- closure of the outlet/inlet valve to be calibrated and opening of the associated inlet/outlet valve of the wheel brake, wherein it is advantageous if a total of at least one inlet valve is opened,
- carrying out a brake pressure buildup by means of the pressure supply device and setting a valve control variable at the outlet/inlet valve to be calibrated, causing the outlet/inlet valve to be calibrated to open,
- detecting the opening of the outlet/inlet valve to be calibrated by means of the pressure medium volume (V) output by the pressure supply device, determining the associated values of the valve control variable and the brake pressure, and storing the determined calibration point in the control and regulating unit.

According to a development of the invention, a pressure/volume characteristic curve of the wheel brake connected to the pressure supply device is specified or predetermined. The pressure/volume characteristic curve is then evaluated in order to detect the opening of the outlet/inlet valve to be calibrated. As a particularly preferred option, the evaluation of the pressure/volume characteristic curve of the wheel brake is used in the detection of opening with reference to the pressure medium volume output by the pressure supply device.

In a corresponding manner, preferably as the last-mentioned method step, a comparison is carried out between the pressure medium volume output by the pressure supply device and a specified or predetermined pressure-dependent volume consumption of the wheel brakes which are connected to the pressure supply device by opened inlet valves. If there is a significant deviation between these two volumes, opening of the outlet/inlet valve to be calibrated is detected, and the associated values of the valve control variable and the brake pressure are determined and stored as a calibration point in the control and regulating unit.

In order to obtain a number of calibration points, the particularly preferred procedure is one in which the valve to be calibrated is opened either by carrying out a brake pressure buildup by means of the pressure supply device at each of various values of the valve control variable or repeatedly carrying out a simultaneous brake pressure buildup by means of the pressure supply device and a change in the valve control variable.

In the developments of the method according to the invention, a brake pressure buildup is carried out in ramp form. A change in the valve control variable of the valve to be calibrated advantageously takes place in ramp form or in step form.

A control characteristic for each analogized or analog-controlled inlet and outlet valve of the brake system is preferably determined in the motor vehicle by means of the control and regulating unit at the time when the motor vehicle is first put into operation. Thus, for each of the valves, a specific control characteristic that takes account of variations in manufacture and allows fine pressure control is available for the subsequent operation of the brake system. Adaptation of the control characteristic of the individual inlet and/or outlet valves to variations in manufacture is thereby made possible.

According to a preferred embodiment of the method according to the invention, a control characteristic for each analogized or analog-controlled inlet and outlet valve is determined in the motor vehicle by means of the control and regulating unit during the time in operation of the brake system if a specified event is present and/or a specified time period has expired. The effects of aging of the valves are taken into account through the repeated determination of the control characteristics.

An aspect of the invention also relates to a brake system. A brake system according to an aspect of the invention is designed to perform a method according to the invention.

This is preferably a brake system for motor vehicles which can be controlled both by the vehicle driver and also independently of the vehicle driver in a "brake-by-wire" operating mode, and is preferably operated by means of the pressure supply device in the "brake-by-wire" operating mode and can be operated in at least one fallback operating mode, in which only operation by the vehicle driver is possible.

The pressure supply device is preferably formed by a cylinder-piston arrangement, the piston of which can be actuated by an electromechanical actuator. The pressure medium volume output or consumed by the pressure supply device and/or the volume flow output by the pressure supply device is/are preferably determined by means of a location detection device, which detects a variable that characterizes the position or location of the piston, advantageously the location of the rotor of the electric motor of the pressure supply device.

BRIEF DESCRIPTION OF THE DRAWINGS

Further preferred embodiments of the invention will emerge from the dependent claims and from the following description by means of figures.

In the schematic drawing.

DETAILED DESCRIPTION OF THE PREFERRED EMBODIMENTS

Figure 1:
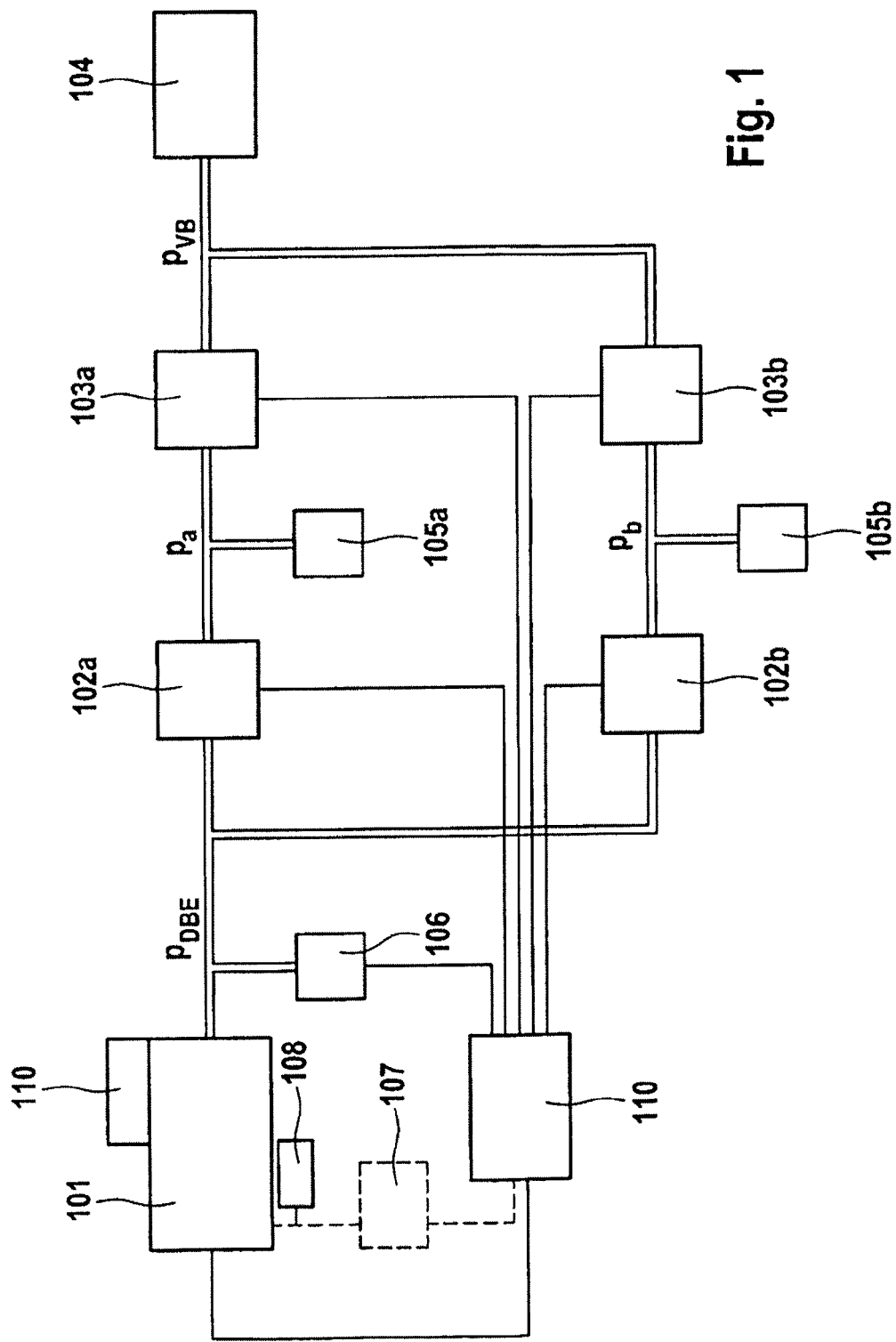
FIG. 1 shows a block diagram of an illustrative brake system for carrying out a method according to the invention.

FIG. 1 shows a block diagram of an illustrative hydraulic brake system for carrying out a method according to the invention. The brake system comprises an electrically controllable, electric-motor-driven pressure supply device 101 for supplying hydraulically actuable wheel brakes 105a, 105b with a pressure $p_{DBE}$. For this purpose, each wheel brake 105a, 105b is connected or can be connected hydraulically to the pressure supply device 101 via an inlet valve 102a, 102b. The pressure $p_{DBE}$ produced by the pressure supply device 101 is determined by means of a pressure detection device 106 (pressure sensor), which is arranged in the hydraulic connection between the pressure supply device 101 and the inlet valves 102a, 102b. The brake system furthermore comprises at least one pressure medium reservoir 104, e.g. a pressure medium reservoir under atmospheric pressure, to which the wheel brakes 105a, 105b are connected via a respective outlet valve 103a, 103b, allowing pressure medium to be discharged from the wheel brakes 105a, 105b into the pressure medium reservoir 104. The pressure $p_{VB}$ in the pressure medium reservoir 104 is either known (being measured by a pressure sensor, for example) or is (approximately) constant or can be assumed to be (approximately) constant (e.g. atmospheric pressure).

For the sake of simplicity, only two wheel brakes 105a, 105b connected to the pressure supply device 101 are shown in the block diagram in FIG. 1. In the case of a brake system for a motor vehicle, the brake system comprises four hydraulically actuable wheel brakes, for example, which are connected or can be connected hydraulically to the pressure supply device 101 and to a low pressure level (e.g. one or more pressure medium reservoirs 104). It is advantageous here if each of the wheel brakes is assigned an inlet valve 102a, 102b, arranged between the pressure supply device 101 and the wheel brake, and an outlet valve 103a, 103b arranged between the wheel brake and the low pressure level (pressure medium reservoir 104).

By way of example, the inlet valves 102a, 102b and the outlet valves 103a, 103b are designed as pressure control valves, i.e. are analogized or capable of analog control.

The valves are preferably embodied as electromagnetically actuable valves, wherein the electric control variable is an electric current I to be fed to the electromagnetic drive. As an alternative, the valves or a part of the valves can be embodied as piezoelectrically controllable valves, wherein the electric control variable is an electric voltage U to be fed to the piezoelectric drive.

In the description which follows, the inlet valves 102a, 102b are assumed to be open in the state of rest (e.g. deenergized) and the outlet valves 103a, 103b are assumed to be closed in the state of rest (e.g. deenergized). However, the method according to the invention can also be carried out in a similar way with inlet valves 102a, 102b that are closed in the state of rest (e.g. deenergized) and/or with outlet valves 103a, 103b that are open in the state of rest (e.g. deenergized).

For control of the pressure supply device 101, of the inlet valves 102a, 102b and of the outlet valves 103a, 103b during operation of the brake system, the brake system comprises an electronic control and regulating unit 110. The control and regulating unit 110 is supplied with the signal of the pressure detection device 106.

Pressure supply device 101 can be adjusted continuously by electric motor. By way of example, it is designed as a hydraulic cylinder-piston arrangement, the piston of which can be actuated by an electric motor via a rotary/translational mechanism (linear actuator). However, it is also possible for pressure supply device 101 to be designed as a piston pump driven by an electric motor.

The pressure medium volume V output by the pressure supply device 101 can be determined by means of a travel or location detection device arranged on or in the pressure supply device 101, which detects a variable that characterizes the position or location of the pressure supply device. By way of example, a sensor 108 is provided for detecting the rotor location of the electric motor. This can also be a sensor for detecting a pump position.

It is advantageous if the brake system comprises a means 107 for detecting whether there is a volume flow through the pressure supply device 101 and/or for determining the magnitude of the volume flow q of the pressure supply device 101. The volume flow can be determined from the motor speed of the electric motor of the pressure supply device, for example. The motor speed can be calculated from measured voltages and currents, for example. To be more precise, the motor speed can be determined by means of the rotor location sensor 108 on the electric motor, for example. From the time profile of the rotor location, it is possible to determine the motor speed, e.g. by numerical derivation.

A control characteristic is taken (in a narrower sense) to be a dependence $I=f(p$ or $\Delta p)$ or $U=f(p$ or $\Delta p)$ of the electric valve control variable (e.g. of the control current I or the control voltage U) on the differential pressure ($\Delta p$) present at the valve or on a pressure (p) present at the valve (in the case of constant pressure at the other valve port) (e.g. current/pressure characteristic curve (I/p characteristic curve), opening characteristic curve). Moreover, the control characteristic is dependent on the volume flow q through the valve, with the result that a valve is fully described by a control characteristic $I=F(p$ or $\Delta p, q)$ or $U=F(p$ or $\Delta p, q)$ (e.g. in the form of a current/pressure characteristic map with volume flow as a parameter, working current characteristic map).

A first illustrative method for determining a control characteristic of an outlet valve is described below. By way of example, the outlet valve 103a of wheel brake 105a, said valve being closed when deenergized, is measured or calibrated. First of all, outlet valve 103a is closed or is already closed. The inlet valve 102a of wheel brake 105a is open (e.g. deenergized), with the result that the pressure o DBE of the pressure supply device 101 is equal to the pressure $p_a$ in wheel brake 105a (inlet-side pressure of outlet valve 103a) and can be determined by means of the pressure sensor 106. At the other wheel brakes, inlet valve 102b or outlet valve 103b or both are closed. By means of the pressure supply device 101, a first, e.g. specified, brake pressure is built up in the wheel brake 105a belonging to the outlet valve 103a to be calibrated, and is held constant by stopping the pressure supply device 101, i.e. the volume flow q of the pressure supply device is equal to zero. With the pressure supply device 101 inactive (unactivated), the electric valve control variable I of outlet valve 103a is changed continuously or in steps by means of the control and regulating unit 110, i.e. with an outlet valve 103a closed when deenergized, the current is increased continuously or in steps. When outlet valve 103a opens at a particular value of the valve control variable I, it being possible to detect this from a pressure drop across the pressure sensor 106, the pair of values comprising the value of the valve control variable I and the pressure $p_{DBE}$ is determined just before opening and is stored as a calibration point of the control characteristic, e.g. in the control and regulating unit 110. The pressure across outlet valve 103a is the differential pressure $\Delta p = p_a - p_{VB} = p_{DBE} - p_{VB}$. The method steps described are repeated at various brake pressure values. The pairs of values comprising the control variable I input and the associated pressure $p_{DBE}$ are in each case determined and stored as calibration points of the control characteristic.

In a second illustrative method for determining a control characteristic of an outlet valve, the procedure is not successively to build up various pressures, to set the volume flow q of the pressure supply device 101 to zero and then to change the valve control variable I of outlet valve 103a for each pressure but either to carry out a brake pressure buildup by means of the pressure supply device 101 at various control variables I or to increase the control variable I and the pressure $p_{DBE}$ simultaneously. In this case, the pressure/volume characteristic curve of the wheel brake (e.g. 105a), which is connected to the pressure supply device 101 via an open inlet valve, must be known. The pressure/volume characteristic curve of a wheel brake is taken to mean the pressure medium requirement or volume consumption of the wheel brake as a function of the brake pressure or, in other words, the relationship between the brake pressure (corresponding to the braking torque) and the pressure-medium or volume requirements of the wheel brake. In the case of the pressure buildup by means of the pressure supply device 101, the pressure medium volume V output by the pressure supply device 101 is determined and compared with the pressure medium consumption of the wheel brake connected to the pressure supply device to be expected from the known pressure/volume characteristic curve. An opening point of outlet valve 103a, i.e. an associated pair of values comprising the valve control variable I and the pressure value $p_{DBE}$ can be detected from the fact that the pressure supply device 101 outputs more pressure medium volume V than is expected from the pressure medium consumption of the connected wheel brake. In this way, a number of calibration points of the control characteristic are determined and stored in succession.

It is advantageous if relevant intermediate points of the control characteristic are measured as calibration points. The regions between the calibration points can be defined by interpolation, while regions outside the calibration points can be defined by extrapolation, thus enabling a "complete" control characteristic to be determined and, if appropriate, stored.

In normal braking operation of the brake system, the stored control characteristic for outlet valve 103a is used for pressure regulation with a high accuracy by determination of the appropriate control variable I for outlet valve 103a at the desired pressure $p_a$ by means of the control characteristic.

The first and second illustrative methods described for determining the control characteristic of an outlet valve can advantageously also be carried out in a similar way to determine the control characteristic of an inlet valve, e.g. inlet valve 102a. For this purpose, the inlet valve 102a to be calibrated is closed. In addition, at least one wheel brake other than the wheel brake of the inlet valve to be calibrated (e.g. wheel brake 105b) is connected via the open inlet valve (e.g. 102b) thereof to the pressure supply device 101, and the associated outlet valve (e.g. 103b) is closed. The other inlet valves are closed. The other method steps relating to the building up of a pressure by means of the pressure supply device 101 and the changing/setting of the valve control variable I of the valve to be measured (in this case an inlet valve instead of an outlet valve) in order to determine the calibration point or calibration points correspond to the method steps described above, while, in the case of an inlet valve which is open when deenergized, the control variable I is correspondingly reduced and not increased, as in the case of the illustrative outlet valve, which is closed when deenergized.

A third illustrative method for determining a control characteristic of an inlet valve is described below. This is advantageously carried out when none of the wheel brakes are to be connected continuously to the pressure supply device via an open inlet valve. By way of example, the inlet valve 102a of wheel brake 105a, said inlet valve being open when deenergized, is measured or calibrated. First of all, all the inlet valves 102a, 102b are closed or already closed. At least the outlet valve 103a of wheel brake 105a is open, with the result that the pressure $p_a$ in wheel brake 105a (outlet-side pressure of inlet valve 102a) is equal to the pressure $p_{VB}$ in the pressure medium reservoir 104 (e.g. atmospheric pressure). As an alternative, it is also possible for the wheel pressure $p_a$ to be estimated from the volume consumed by wheel brake 105a with outlet valve 103a closed. The inlet-side pressure of inlet valve 102a corresponds to the pressure $p_{DBE}$ of the pressure supply device 101, which can be determined by means of the pressure sensor 106. Thus, it is in each case the differential pressure $\Delta p = p_{DBE} - p_{VB}$ which is present across inlet valve 102a.

According to a first variant of the third embodiment, at a first, e.g. specified, pressure value $p_{DBE}$ of the pressure supply device 101, i.e. a fixed motor torque is set for the electric motor of the pressure supply device 101, for example, the control variable I of inlet valve 102a is reduced by the control and regulating unit 110 until inlet valve 102a opens. The opening point is detected by observing the volume flow q of the pressure supply device 101, e.g. with reference to the motor speed of the electric motor of the pressure supply device. When the beginning of a volume flow q of the pressure supply device 101 is detected, the corresponding pair of values comprising the valve control variable I input and the pressure $p_{DBE}$ is determined and stored as a calibration point. The method is then carried out for various pressure values $p_{DBE}$ of the pressure supply device 101, and the corresponding $I/p_{DBE}$ pairs of values are determined and stored.

According to a second variant of the third embodiment, the control variable I of inlet valve 102a is set successively to different values, and the pressure $p_{DBE}$ of the pressure supply device 101 is in each case increased, i.e. a rising motor torque is specified for the electric motor of the pressure supply device 101, until inlet valve 102a opens. According to a third variant of the third embodiment, the control variable I of inlet valve 102a is changed (reduced by way of example) and the pressure $p_{DBE}$ of the pressure supply device 101 is simultaneously increased until inlet valve 102a opens. In both variants, as in the first variant of the third embodiment, the opening point is detected by observing the volume flow q of the pressure supply device 101, e.g. with reference to the motor speed of the electric motor of the pressure supply device. When the beginning of a volume flow q is detected (q>0) of the pressure supply device 101, the corresponding pair of values comprising the valve control variable I input and the pressure $p_{DBE}$ is determined and stored as a calibration point.

As in the first and the second embodiment, relevant intermediate points of the control characteristic of the inlet valve are advantageously measured as calibration points by the third embodiment too. Regions between the calibration points can be defined by interpolation.

If the brake system comprises a means 107 for determining or setting the magnitude of the volume flow of the pressure supply device 101, the control characteristic (e.g. I/p characteristic curve) of the inlet valves and/or of the outlet valves can advantageously be determined at different volume flows q of the pressure supply device 101, with the volume flow q of the pressure supply device 101 corresponding to the volume flow through the valve to be calibrated. It is thus also possible to determine the control characteristic $I=F(p$ or $\Delta p, q)$ or $U=F(p$ or $\Delta p, q)$ of the valve, e.g. the dependence of the I/p characteristic curve on the volume flow q through the valve.

In normal braking operation of the brake system, the stored control characteristic for the inlet or outlet valve is used for high accuracy pressure regulation.

The above-described methods for determining a control characteristic of an inlet or outlet valve are advantageously carried out, in succession for example, for each analogized or analog-controlled inlet and outlet valve.

By way of example, a method according to the invention for determining a control characteristic of an analogized or analog-controlled inlet and/or outlet valve is initiated independently at the time of initial startup in the motor vehicle. In the process, the control characteristic of each analogized or analog-controlled inlet and outlet valve is advantageously determined. A corresponding routine is stored, e.g. in the control and regulating unit. It is thereby made possible to adapt the control characteristic of the individual inlet and/or outlet valves to variations in manufacture.

It is furthermore advantageous if a method for determining the control characteristics or for calibrating the inlet and/or outlet valves is carried out repeatedly in an event-controlled and/or time-controlled manner in the motor vehicle during the time in operation. In this way, it is possible to achieve adaptation of the control characteristic of the individual inlet and/or outlet valves to aging effects.

According to another embodiment, at least one default control characteristic or a control characteristic map is stored in the control and regulating unit. This can be used for pressure regulation during the operation of the brake system until a valve-specific control characteristic has been determined for the inlet or outlet valve.

Figure 2:
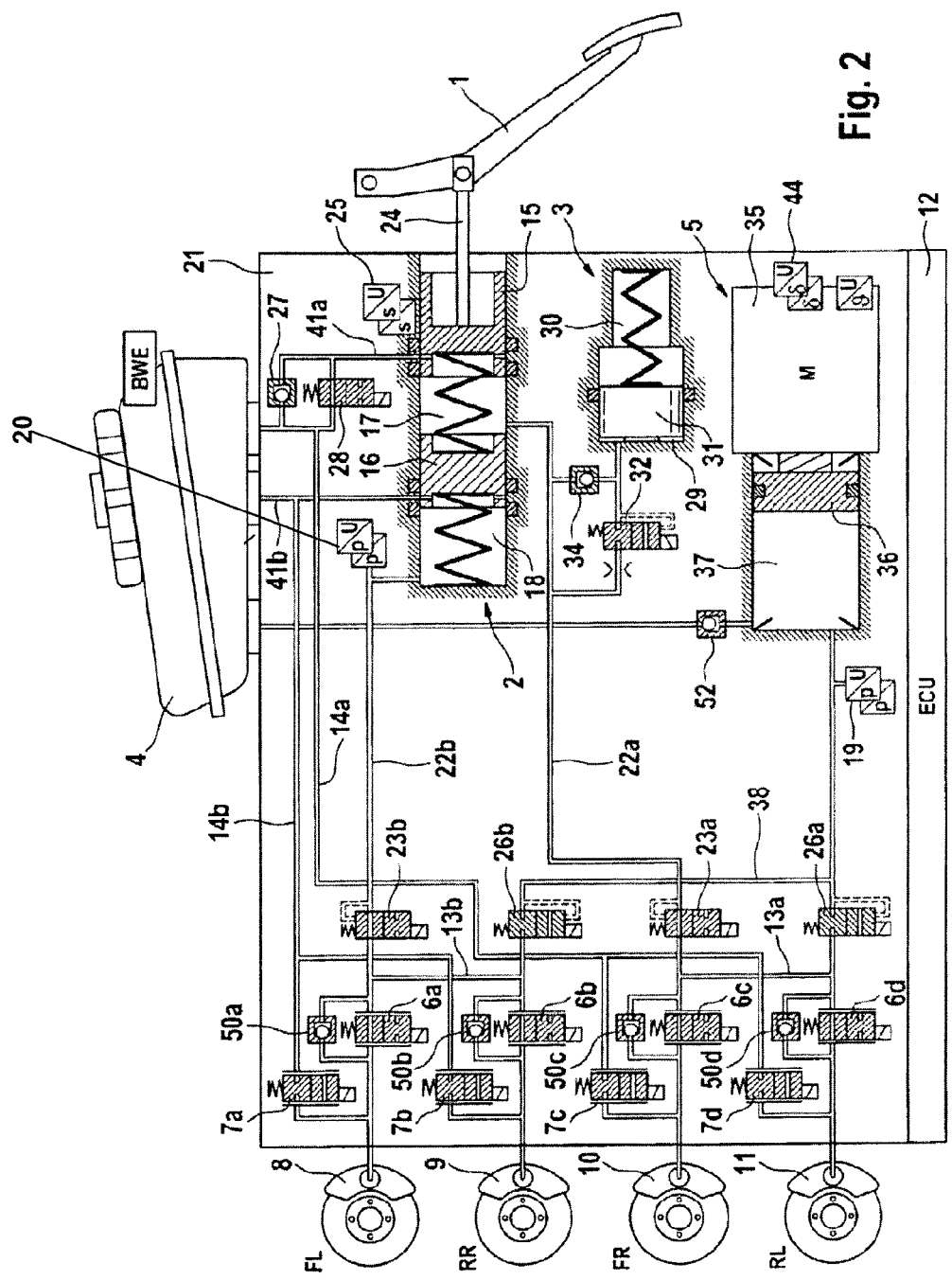
FIG. 2 shows an illustrative brake system for carrying out a method according to the invention.

An illustrative brake system for carrying out a method according to the invention is shown schematically in FIG. 2. The brake system essentially comprises a hydraulic actuating unit 2 that can be actuated by means of an actuating or brake pedal 1, a travel simulator or simulation device 3 that interacts with the hydraulic actuating unit 2, a pressure medium reservoir 4 that is associated with the hydraulic actuating unit 2 and is under atmospheric pressure, an electrically controllable pressure supply device 5, an electronic control and regulating unit 12 and an electrically controllable pressure modulation device.

By way of example, the pressure modulation device comprises, for each wheel brake 8, 9, 10, 11 of a motor vehicle (not shown), an inlet valve 6a-6d and an outlet valve 7a-7d, said valves being connected together hydraulically in pairs via center ports and connected to the wheel brakes 8, 9, 10, 11. The inlet ports of the inlet valves 6a-6d are supplied by means of brake circuit supply lines 13a, 13b with pressures which, in a "brake-by-wire" operating mode, are derived from a system pressure present in a system pressure line 38 connected to a pressure space 37 of the electrically controllable pressure supply device 5. A check valve 50a-50d opening toward the brake circuit supply lines 13a, 13b is connected in parallel with each of the inlet valves 6a-6d. In a fallback operating mode, the brake circuit supply lines 13a, 13b are subjected to the pressures of the pressure spaces 17, 18 of the actuating unit 2 via hydraulic lines 22a, 22b. The outlet ports of the outlet valves 7a-7d are connected to the pressure medium reservoir 4 in pairs by return lines 14a, 14b.

The hydraulic actuating unit 2 has, in a housing 21, two pistons 15, 16 arranged in series, which delimit hydraulic chambers or pressure spaces 17, 18 that, together with the pistons 15, 16, form a dual-circuit brake master cylinder or a tandem master cylinder. The pressure spaces 17, 18 are connected, on the one hand, to the pressure medium reservoir 4 via radial bores formed in the pistons 15, 16 and via corresponding pressure compensating lines 41a, 41b, wherein said bores and lines can be shut off by a relative movement of the pistons 17, 18 in the housing 21, and, on the other hand, by means of the hydraulic lines 22a, 22b to the brake circuit supply lines 13a, 13b already mentioned, via which the inlet valves 6a-6d are connected to the actuating unit 2. In this case, a diagnostic valve 28 which is open when deenergized is connected in parallel in the pressure compensating line 41a with a check valve 27 that closes toward the pressure medium reservoir 4. The pressure spaces 17, 18 accommodate return springs (not denoted specifically), which position the pistons 15, 16 in an initial location when the brake master cylinder 2 is unactuated. A piston rod 24 couples the pivoting movement of the brake pedal 1 due to a pedal actuation to the translational movement of the first (master cylinder) piston 15, the actuating travel of which is detected by a travel sensor 25, preferably embodied in a redundant manner. As a result, the corresponding piston travel signal is a measure of the brake pedal actuation angle. It represents a braking demand by a vehicle driver.

Respective isolating valves 23a, 23b, which are each designed as electrically actuable valves, which are preferably open when deenergized, are arranged in the line sections 22a, 22b connected to the pressure spaces 17, 18. By means of the isolating valves 23a, 23b, the hydraulic connection between the pressure spaces 17, 18 and the brake circuit supply lines 13a, 13b can be shut off. A pressure sensor 20 connected to line section 22b detects the pressure built up in pressure space 18 through a displacement of the second piston 16.

Travel simulator 3 is coupled hydraulically to the brake master cylinder 2 and is designed, for example, as an independent subassembly which consists essentially of a simulator chamber 29, a simulator spring chamber 30, and a simulator piston 31 separating the two 3 0 chambers 29, 30 from one another. Simulator piston 31 is supported on the housing 21 by means of an elastic element (e.g. a spring), which is arranged in the simulator spring chamber 30 and is advantageously preloaded. The simulator chamber 29 can be connected to the first pressure space 17 of the tandem master cylinder 2 by means of an electrically actuable simulator enable valve 32. When a pedal force is specified and the simulator enable valve 32 is activated, pressure medium flows from brake master cylinder pressure space 17 into the simulator chamber 29. A check valve 34 arranged hydraulically antiparallel to the simulator enable valve 32 allows a largely unhindered return flow of the pressure medium from the simulator chamber 29 to brake master cylinder pressure space 17, independently of the operating state of the simulator enable valve 32.

The electrically controllable pressure supply device 5 is designed as a hydraulic cylinder-piston arrangement or a single-circuit electrohydraulic actuator, the piston 36 of which can be actuated by a schematically indicated electric motor 35 via a rotary/translational mechanism, likewise illustrated schematically. Piston 36 delimits a pressure space 37. Additional pressure medium can be drawn into pressure space 37 by retraction of piston 36 with the connection valves 26a, 26b closed, allowing pressure medium to flow out of the pressure medium reservoir 4, via an anti-cavitation valve 52 designed as a check valve which opens in the direction of flow to the actuator, into the actuator pressure space 37.

To detect a variable that is characteristic of the position/location of the piston 36 of the pressure supply device 5, there is a sensor 44 which, by way of example, is embodied as a rotor location sensor serving for the detection of the rotor location of the electric motor 35. Other sensors are likewise conceivable, e.g. a travel sensor for detecting the position/location of piston 36. By means of the variable that is characteristic of the position/location of piston 36, it is possible to determine the pressure medium volume V output or consumed by the pressure supply device 5. A pressure sensor 19, preferably of redundant design, is provided to detect the pressure P produced by the pressure supply device 5.

In a normal braking function of the brake system ("brake-by-wire" operating mode), brake master cylinder 2 and hence the vehicle driver are decoupled from the wheel brakes 8, 9, 10, 11 by the closed isolating valves 23a, 23b, and the brake circuit supply lines 13a, 13b are connected by the opened connection valves 26a, 26b to the first pressure supply device 5, which supplies the system pressure for actuating the wheel brakes 8, 9, 10, 11. Simulation device 3 is connected up by the opened simulator enable valve 32, with the result that the pressure medium volume displaced in the brake master cylinder 2 through the actuation of the brake pedal 1 by the driver is received by the simulation device 3, and the simulation device 3 imparts to the vehicle driver a familiar brake pedal feel.

In a fallback operating mode of the brake system, e.g. in the case of failure of the electric energy supply of the entire brake system, the simulation device 3 is disconnected by the simulator enable valve 32, which is closed when deenergized, and the pressure supply device 5 is isolated from the brake circuit supply lines 13a, 13b by the connection valves 26a, 26b, which are closed when deenergized. Brake master cylinder 2 is connected via lines 22a, 22b to the isolating valves 23a, 23b, which are open when deenergized, to the brake circuit supply lines 13a, 13b and hence to the wheel brakes 8, 9, 10, 11, allowing the vehicle driver to build up pressure in the wheel brakes 8, 9, 10, 11 directly by actuating the brake pedal 1.

The invention claimed is:

1. A method for determining a control characteristic of an analogized or analog-controlled hydraulic valve of a brake system for motor vehicles, having hydraulically actuable wheel brakes, the method comprising:
passing a brake pressure ($p_{DBE}$), produced with the aid of an electrically controllable, electric-motor- driven pressure supply device, via an inlet valve to a wheel brake and
passing the brake pressure ($p_{DBE}$) out of the wheel brake into a pressure medium reservoir, via an outlet valve,
controlling, by an electronic control and regulating unit, the pressure supply device and the inlet valves, and the outlet valves, the control characteristic describing at least one relationship of dependence between an electric valve control variable and a differential pressure ($\Delta p$) or pressure (p) present at the valve, producing a brake pressure by the control and regulating unit by the pressure supply device to determine the control characteristic of an analogized or analog-controlled inlet or outlet valve, determining the brake pressure ($p_{DBE}$) by a pressure sensor associated with the pressure supply device, and storing the brake pressure ($p_{DBE}$) determined and an associated valve control variable as a calibration point of the control characteristic in the control and regulating unit, wherein the following steps are carried out to determine the control characteristic of an analogized or analog-controlled outlet or inlet valve of a wheel brake:

a) closing the outlet/inlet valve to be calibrated and opening of the associated inlet/outlet valve of the wheel brake, b) building up a predetermined brake pressure value by the pressure supply device and stopping of the electric motor of the pressure supply device, c) changing the valve control variable of the outlet/inlet valve to be calibrated, causing the outlet/inlet valve to be calibrated to open, d) detecting the opening of the outlet/inlet valve to be calibrated by the pressure sensor, e) determining the associated values of the valve control variable and the brake pressure, and f) storing the determined calibration point in the control and regulating unit.

2. The method as claimed in claim 1, wherein regions of the control characteristic, between calibration points, are completed by interpolation or extrapolation or by a model, and the completed control characteristic is stored in the control and regulating unit.

3. The method as claimed in claim 1, wherein the pressure ($P_{VB}$) is determined in the pressure medium reservoir or is constant or is assumed to be constant.

4. The method as claimed in claim 1, wherein the wheel brakes can be connected via the outlet valves to a pressure medium reservoir under atmospheric pressure.

5. The method as claimed in claim 1, wherein the control characteristic of the analogized or analog-controlled inlet or outlet valve is determined for various volume flows (q) through the valve by determining the control characteristic at various volume flows of the pressure supply device, wherein the volume flow (q) of the pressure supply device is determined by the motor speed of the electric motor of the pressure supply device.

6. The method as claimed in claim 1, wherein at least one wheel brake is connected hydraulically to the pressure supply device during the method steps.

7. The method as claimed in claim 6, wherein a pressure/volume characteristic curve of the wheel brake connected to the pressure supply device is specified or predetermined, and in that the pressure/volume characteristic curve is evaluated in order to detect the opening of the outlet/inlet valve to be calibrated.

8. The method as claimed in claim 1, wherein at least two of i) the brake pressure buildup carried out by the pressure supply device at each of various values of the valve control variable, ii) the change in the valve control variable carried out at each of various brake pressures ($P_{DBE}$) of the pressure supply device, and iii) the brake pressure buildup by the pressure supply device and a change in the valve control variable are carried out simultaneously.

9. The method as claimed in claim 1, wherein a control characteristic for each analogized or analog-controlled inlet and outlet valve of the brake system is determined in the motor vehicle by the control and regulating unit at the time when the motor vehicle is first put into operation.

10. The method as claimed in claim 1, wherein a control characteristic for each analogized or analog-controlled inlet and outlet valve is determined in the motor vehicle by the control and regulating unit during the time in operation of the brake system if a specified event is present and/or a specified time period has expired.

11. A method for determining a control characteristic of an analogized or analog-controlled hydraulic valve of a brake system for motor vehicles, having hydraulically actuable wheel brakes, the method comprising:

passing a brake pressure ($p_{DBE}$), produced with the aid of an electrically controllable, electric-motor- driven pressure supply device, via an inlet valve to a wheel brake and passing the brake pressure ($p_{DBE}$) out of the wheel brake into a pressure medium reservoir, via an outlet valve, controlling, by an electronic control and regulating unit, the pressure supply device and the inlet valves, and the outlet valves, the control characteristic describing at least one relationship of dependence between an electric valve control variable and a differential pressure ($\Delta p$) or pressure (p) present at the valve, producing a brake pressure by the control and regulating unit by the pressure supply device to determine the control characteristic of an analogized or analog-controlled inlet or outlet valve, determining the brake pressure ($p_{DBE}$) by a pressure sensor associated with the pressure supply device, and storing the brake pressure ($p_{DBE}$) determined and an associated valve control variable as a calibration point of the control characteristic in the control and regulating unit, wherein the following steps are carried out in order to determine the control characteristic of an analogized or analog-controlled outlet or inlet valve of a wheel brake:

closing the outlet/inlet valve to be calibrated and opening of the associated inlet/outlet valve of the wheel brake, wherein, at least one inlet valve of the brake system is opened, building up a brake pressure by the pressure supply device and setting a valve control variable at the outlet/inlet valve to be calibrated, causing the outlet/inlet valve to be calibrated to open, detecting the opening of the outlet/inlet valve to be calibrated by the pressure medium volume (V) output by the pressure supply device, determining the associated values of the valve control variable and the brake pressure, and storing the determined calibration point in the control and regulating unit.

12. The method as claimed in claim 11, wherein at least one wheel brake is connected hydraulically to the pressure supply device during the method steps.

13. A method for determining a control characteristic of an analogized or analog-controlled hydraulic valve of a brake system for motor vehicles, having hydraulically actuable wheel brakes, the method comprising:

passing a brake pressure ($p_{DBE}$), produced with the aid of an electrically controllable, electric-motor-driven pressure supply device, via an inlet valve to a wheel brake and passing the brake pressure ($p_{DBE}$) out of the wheel brake into a pressure medium reservoir, via an outlet valve, controlling, by an electronic control and regulating unit, the pressure supply device and the inlet valves, and the outlet valves, the control characteristic describing at least one relationship of dependence between an electric valve control variable and a differential pressure ($\Delta p$) or pressure ($p$) present at the valve, producing a brake pressure by the control and regulating unit by the pressure supply device to determine the control characteristic of an analogized or analog-controlled inlet or outlet valve, determining the brake pressure ($p_{DBE}$) by a pressure sensor associated with the pressure supply device, and storing the brake pressure ($p_{DBE}$) determined and an associated valve control variable as a calibration point of the control characteristic in the control and regulating unit, wherein the following steps are carried out in order to determine the control characteristic of an analogized or analog-controlled inlet valve:

closing of all the inlet valves and opening of at least the outlet valve of the wheel brake of the inlet valve to be calibrated, building up of a brake pressure ($P_{DBE}$) by the pressure supply device and setting of a valve control variable at the inlet valve to be calibrated, causing the inlet valve to be calibrated to open, detecting the opening of the inlet valve to be calibrated by a volume flow of the pressure supply device or the motor speed of the electric motor of the pressure supply device, determining the associated values of the valve control variable and the brake pressure ($P_{DBE}$), and storing the determined calibration point in the control and regulating unit.

14. The method as claimed in claim 13, wherein the outlet valve of the wheel brake of the inlet valve to be calibrated is closed, and the wheel brake pressure of the wheel brake is determined by a specified or predetermined pressure/volume characteristic curve of the wheel brake and of the pressure medium volume output by the pressure supply device.

15. (A brake system for motor vehicles comprising:

an electrically controllable, electric-motor-driven pressure supply device, which can supply a brake pressure ($p_{DBE}$) for actuating hydraulically actuable wheel brakes, wherein the pressure supply device is configured to be connected separably to the wheel brakes by respective electrically controllable inlet valves, one electrically controllable outlet valve per wheel brake, via which the wheel brake is connected separably to a pressure medium reservoir, in under atmospheric pressure, a pressure detection device for determining the brake pressure ($p_{DBE}$) supplied by the pressure supply device, a brake master cylinder that can be actuated by a brake pedal and is connected separably to the wheel brakes, and an electronic control and regulating unit for controlling the pressure supply device and the inlet and outlet valves, wherein at least one inlet valve or one outlet valve is analogized or capable of analog control, wherein the method of claim 1 is carried out in the electronic control and regulating unit, for each analogized or analog-controlled inlet valve and outlet valve of the brake system.

* * * * *